United States Patent
Snyder

(10) Patent No.: US 10,298,339 B2
(45) Date of Patent: *May 21, 2019

(54) WATER SAFETY MONITORING DEVICES, ALARM DEVICES AND RELATED METHODS

(71) Applicant: Graham E. Snyder, Raleigh, NC (US)

(72) Inventor: Graham E. Snyder, Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/341,783

(22) Filed: Nov. 2, 2016

(65) Prior Publication Data

US 2017/0124841 A1     May 4, 2017

Related U.S. Application Data

(60) Provisional application No. 62/249,480, filed on Nov. 2, 2015.

(51) Int. Cl.
*G08B 21/08* (2006.01)
*H04B 17/318* (2015.01)

(52) U.S. Cl.
CPC ......... *H04B 17/318* (2015.01); *G08B 21/088* (2013.01)

(58) Field of Classification Search
CPC .............................. G08B 21/08; H04B 17/318
USPC ...................................................... 340/573.6
See application file for complete search history.

(56) References Cited

U.S. PATENT DOCUMENTS

| | | | | |
|---|---|---|---|---|
| 2003/0222782 A1* | 12/2003 | Gaudreau | ............ | G08B 21/082 340/573.6 |
| 2008/0150733 A1* | 6/2008 | Snyder | ................ | G08B 21/088 340/573.6 |
| 2008/0278338 A1* | 11/2008 | Krell | .................... | G08B 21/088 340/573.6 |
| 2015/0161870 A1* | 6/2015 | Podlisker | ............... | G08B 21/08 340/573.6 |
| 2016/0005292 A1* | 1/2016 | Carroll | ................ | G08B 21/088 340/539.13 |

* cited by examiner

*Primary Examiner* — Jack K Wang
(74) *Attorney, Agent, or Firm* — Myers Bigel, P.A.

(57) ABSTRACT

A monitoring device for monitoring a risk of drowning for users of one or more alarm devices is provided. The alarm devices include one or more detectors configured to detect status data of the user, and the alarm device transmits a signal from at or below a water surface. A monitoring station has a controller circuit configured to receive status data from the alarm device, to detect a triggering event, and, in response to the triggering event, to select one of a plurality of alarm protocols based on the status data. The monitoring station is configured to provide a user alert to the alarm device if a loss in signal strength of the alarm device is detected by the monitoring station, and the alarm device is configured to receive a deactivation input such that if a deactivation input is received within a predetermined time, the alarm protocol is canceled and/or an alarm protocol is not issued to the monitoring station.

20 Claims, 14 Drawing Sheets

WATER SAFETY MONITORING DEVICES, ALARM DEVICES AND RELATED METHODS

RELATED APPLICATIONS

The present application claims priority to U.S. Provisional Application Ser. No. 62/249,480, filed Nov. 2, 2015, the disclosure of which is incorporated herein in its entirety.

FIELD OF THE INVENTION

The present invention relates to water safety monitoring devices.

BACKGROUND

Drowning remains a significant cause of accidental deaths, especially among children. Many children are non-swimmers and die as a result of falling into pools or off of boats; however, many children and adults who are swimmers die either from panic, exhaustion, cramps, seizures or a combination thereof. Children may drown despite being supervised while swimming. The parents or other adults supervising the child may have "just looked away for a second" only to find the child drowned on the bottom of the pool.

Several attempts have been made to address water safety with various degrees of success. For the non-swimmer, such as a toddler, the Safety Turtle™ device (Terrapin Communications Inc., Ottawa, Canada) is a bracelet, which when submerged triggers a pool-side alarm to activate and to notify that a person has fallen into the water. Although the Safety Turtle™ device is excellent at detecting a person falling into the water, it may not be suitable for a child who is allowed to play in the water because the Safety Turtle™ device will generally activate in the course of normal play whenever the child's arm is submerged and produce false alarms.

Another approach taken to prevent drowning is to place an alarm on the pool itself. When a pool sensor detects entrance into the pool an alarm is activated. This alarm may be useful if the pool is empty, but is not suited for use with a child who is allowed to play in the pool. This device may not be easily transferred from one pool to another and may not be suitable for use in lakes or oceans.

Japanese Patent Publication No. 02241890 proposes a necklace, which when submerged would inflate and pull the drowning person to the surface by his/her neck. This may present a possibility of strangulation from the device itself. Because the device uses compressed air, it may only be used once. In addition, the amount of compressed air to float a person to the surface may entail a substantial amount of weight. In addition, the necklace could float to the surface and the user's head (which may be unconscious) might still be under water.

U.S. Patent Application Publication 2004/0095248 to Mandel proposes a device that is worn as a headband. When the device is submerged for a predetermined amount of time, it produces an ultrasonographic signal to be detected by sensors in the side of the pool to notify of a drowning person. This device is configured to transmit signals that propagate through water and is apparently dependent on a poolside receiver to detect ultrasonographic signals reliably. U.S. Pat. No. 4,714,914 to Boe proposes a wearable device, which when submerged will activate (or deactivate) a radio frequency alarm. Both devices may be limited by the power of the RF transmitter and the tremendous decrease in range and reliability that occurs when transmitters send a signal through a water/air interface. These devices are designed such that even trivial submersion (½ inch) can potentially trigger the alarm and will false alarm in a child that has a small layer of water over the alarm such as will occur during active play or brisk swimming. Such devices also may also be affixed to the body, for example, on a headband or on the back of the user. Both locations may be submerged slightly for prolonged amounts of time when the user is not actually at risk for drowning. Therefore, false alarms remain a problem for these devices.

Other devices, such as U.S. Pat. No. 5,097,254 to Merrithew, depend on a pressure sensor to detect submersion for prolonged amounts of time. Pressure sensors may present a reliability problem because the difference in pressure difference between 3 inches below water and 18 inches below water are small and difficult to accurately detect or calibrate. However, even if calibrated correctly, a device that is 18 inches under water could indicate normal activity or it could indicate a drowning situation depending on where the device is worn, how long it has been submerged, etc. The calibration of such a device may become inaccurate over time due to normal wear on the device or changes in temperature.

Lifeguards, although not perfect, are a relatively reliable method of preventing drowning. Any device meant to augment drowning prevention must have a fail-safe design with a malfunction rate approaching zero. Previous attempts as described in the above art often rely on batteries, circuit boards, and sensors, all of which have a predefined failure rate which over time is unacceptably high. The algorithms described in our device have reduced those failure rates to a frequency approaching zero.

Accordingly, there remains a need for a reliable device for detecting potential drowning in users such as children who are permitted to have some water contact during the course of normal activities or play.

SUMMARY OF EMBODIMENTS OF THE INVENTION

A monitoring device for monitoring a risk of drowning for users of one or more alarm devices is provided. The alarm devices include one or more detectors configured to detect status data of the user, and the alarm device transmits a signal from at or below a water surface. A monitoring station has a controller circuit configured to receive status data from the alarm device, to detect a triggering event, and, in response to the triggering event, to select one of a plurality of alarm protocols based on the status data. The monitoring station is configured to provide a user alert to the alarm device if a loss in signal strength of the alarm device is detected by the monitoring station, and the alarm device is configured to receive a deactivation input such that if a deactivation input is received within a predetermined time, the alarm protocol is canceled and/or an alarm protocol is not issued to the monitoring station.

In some embodiments, the monitoring station is a first monitoring station in a pool area, and the system further includes a second monitoring station a distance away from the pool area in communication with the first monitoring station, wherein at least one of the first and second monitoring stations are configured to detect a first signal strength of an alarm device received at the first monitoring station and a second signal strength received from the alarm device received at the second monitoring station, and to provide the user alert if the second signal strength at the second monitoring station is above a threshold level.

In some embodiments, the first monitoring station is configured to issue the alarm protocol indicating a potential drowning event if the second signal strength at the second monitoring station is below the threshold level and the first signal strength at the first monitoring station is below another threshold level.

In some embodiments, the control circuit is configured to select an alarm if the device is disconnected from the user, and the control circuit is further configured to select a higher level of alarm if the device is disconnected while wet and a lower level of alarm or no alarm at all if the device is disconnected while dry.

In some embodiments, the alarm device comprises a water sensor, and the alarm device has an active mode in which a signal is transmitted to the monitoring station and an inactive mode that uses a lower level of power than the active mode, wherein the alarm device is configured to switch from the inactive mode to the active mode if the alarm device water sensor detects water. The alarm device switches from the inactive mode to the active mode when the alarm device water sensor detects water and the alarm device is connected to the monitoring station. When the alarm device switches from the inactive mode to the active mode when the alarm device water sensor detects water and the alarm device is not connected to the monitoring station, the alarm device is configured to trigger an alarm protocol at the alarm device.

In some embodiments, the alarm device transmits an RF signal at a power and frequency that is configured to propagate from a water surface and through a depth of between zero and sixteen inches or more of water, and the triggering event is in response to a signal strength of the RF signal.

In some embodiments, the alarm device transmits an RF signal at a power and frequency that is adjustable by a user to control a propagation depth such that the RF signal has a power and frequency capable of propagating through the propagation depth. The propagation depth may be between two and sixteen inches of water.

In some embodiments, the status data comprises an RF signal having a signal strength profile, and the triggering event comprises an oscillating signal strength profile of the RF signal. The oscillating signal strength profile of the RF signal has a magnitude that decreases over time.

In some embodiments, a transceiver is configured to receive a signal from the alarm device, wherein the signal comprises the status data, and the triggering event comprises a reduction and/or cessation of the signal from the alarm device.

In some embodiments, a monitoring system for monitoring a risk of drowning for users of one or more alarm devices includes: one or more alarm devices configured to transmit a signal from at or below a water surface; and a first monitoring station and a second monitoring station in communication with the first monitoring station, the first and second monitoring stations each having a control circuit configured to receive the signal from at least one of the alarm devices and to determine whether the alarm device is closer to the first monitoring station or the second monitoring station based on a signal strength of the signal from the alarm device. The first and second monitoring stations are configured to detect a triggering event comprising a reduction of signal strength from one of the alarm devices and to selection one of a plurality of alarm protocols based on the reduction of signal strength and the determination of whether the alarm device is closer to the first monitoring station or the second monitoring station.

In some embodiments, the first monitoring station is a pool monitoring station and the second monitoring station is an exit monitoring station, and a higher level of alarm is selected if the alarm device is closer to the pool monitoring station. In some embodiments, if the alarm device is closer to the exit monitoring station when the triggering event is detected, an alarm protocol at the alarm device is initiated to alert the user to return the alarm device.

In some embodiments, the control circuit of at least one of the first and second monitoring station is configured to select an alarm if the device is disconnected from the user, and the control circuit is further configured to select a higher level of alarm if the device is disconnected while wet and a lower level of alarm or no alarm at all if the device is disconnected while dry.

In some embodiments, the alarm device comprises a water sensor, and the alarm device has an active mode in which a signal is transmitted to the monitoring station and an inactive mode that uses a lower level of power than the active mode, wherein the alarm device is configured to switch from the inactive mode to the active mode if the alarm device water sensor detects water.

In some embodiments, when the alarm device switches from the inactive mode to the active mode when the alarm device water sensor detects water and the alarm device is not connected to the monitoring station, the alarm device is configured to trigger an alarm protocol at the alarm device.

In some embodiments, a monitoring system for monitoring a risk of drowning for users of one or more alarm devices includes one or more alarm devices having one or more detectors configured to detect status data of the user, wherein the alarm device transmits a signal from at or below a water surface, and the one or more detectors comprises a water sensor; and a monitoring station having a controller circuit configured to receive status data from the alarm device, to detect a triggering event, and, in response to the triggering event, to select one of a plurality of alarm protocols based on the status data; wherein the alarm device has an active mode in which a signal is transmitted to the monitoring station and an inactive mode that uses a lower level of power than the active mode, and the alarm device is configured to switch from the inactive mode to the active mode if the alarm device water sensor detects water.

In some embodiments, when the alarm device switches from the inactive mode to the active mode when the alarm device water sensor detects water and the alarm device is not connected to the monitoring station, the alarm device is configured to trigger an alarm protocol at the alarm device.

In some embodiments, a method for monitoring a risk of drowning for users of one or more alarm devices is provided. The one or more alarm devices has one or more detectors configured to detect status data of the user, and the alarm device transmits a signal from at or below a water surface, and a monitoring station is configured to receive status data from the alarm device. The method includes receiving status data at the monitoring station from at least one of the alarm devices; detecting a triggering event; and in response to the triggering event, selecting one of a plurality of alarm protocols based on the status data; providing a user alert to the alarm device if a loss in signal strength of the alarm device is detected by the monitoring station; and receiving a deactivation input such that if a deactivation input is received within a predetermined time, the alarm protocol is canceled and/or an alarm protocol is not issued to the monitoring station.

In some embodiments, a method for monitoring a risk of drowning for users of one or more alarm devices that are in communication with first and second monitoring devices is provided. The one or more alarm devices have one or more detectors configured to detect status data of the user, and the alarm device transmits a signal from at or below a water surface. The method includes receiving a signal from at least one of the alarm devices; determining whether the alarm device is closer to the first monitoring station or the second monitoring station based on a signal strength of the signal from the alarm device; and detecting a triggering event comprising a reduction of signal strength from one of the alarm devices; and selecting one of a plurality of alarm protocols based on the reduction of signal strength and the determination of whether the alarm device is closer to the first monitoring station or the second monitoring station.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF EMBODIMENTS OF THE INVENTION

Figure 1:
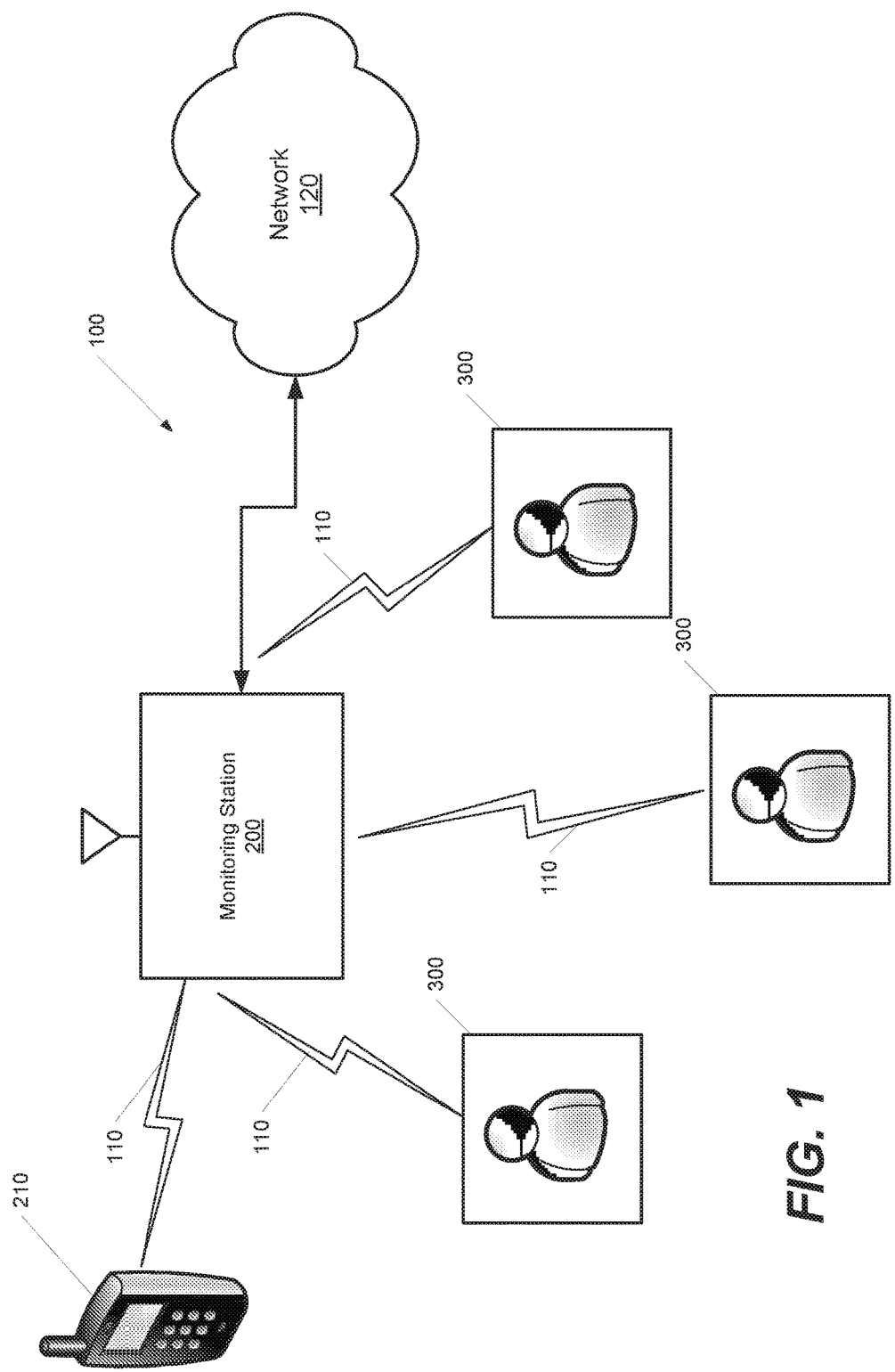
FIG. 1 is a schematic drawing illustrating a monitoring system having a monitoring station and a plurality of user alarm devices according to some embodiments of the present invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

Exemplary embodiments are described below with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer-usable or computer-readable medium may be, for example but not limited to, an electronic, magnetic, optical, electromagnetic, or semiconductor data storage system, apparatus, or device. More specific examples (a non-exhaustive list) of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

As illustrated in FIG. 1, a water safety monitoring system 100 includes a monitoring station 200 and one or more user alarm devices 300. The monitoring station 200 has wireless communication links 110 with the user alarm device 300. In some embodiments, the monitoring station 200 may include one or more portable monitoring unit(s) 202 that may be carried or worn by a user, such as a lifeguard. The monitoring station 200 may also be in communication with a computer network 120, and data from the monitoring station 200 and/or the devices 300 may be communicated via the network 120 to additional computer or communication terminals (not shown).

Figure 2:
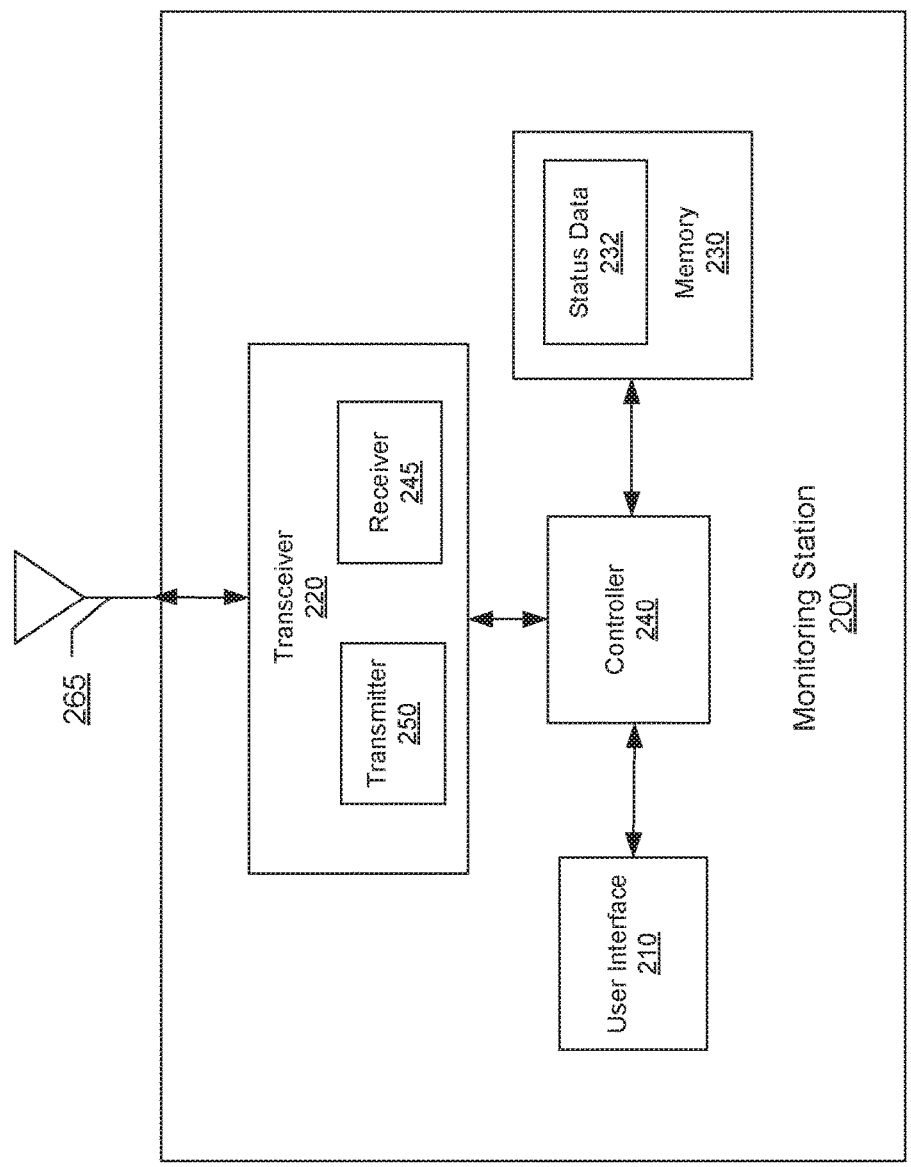
FIG. 2 is a block diagram of a monitoring station according to some embodiments of the present invention.
Figure 3:
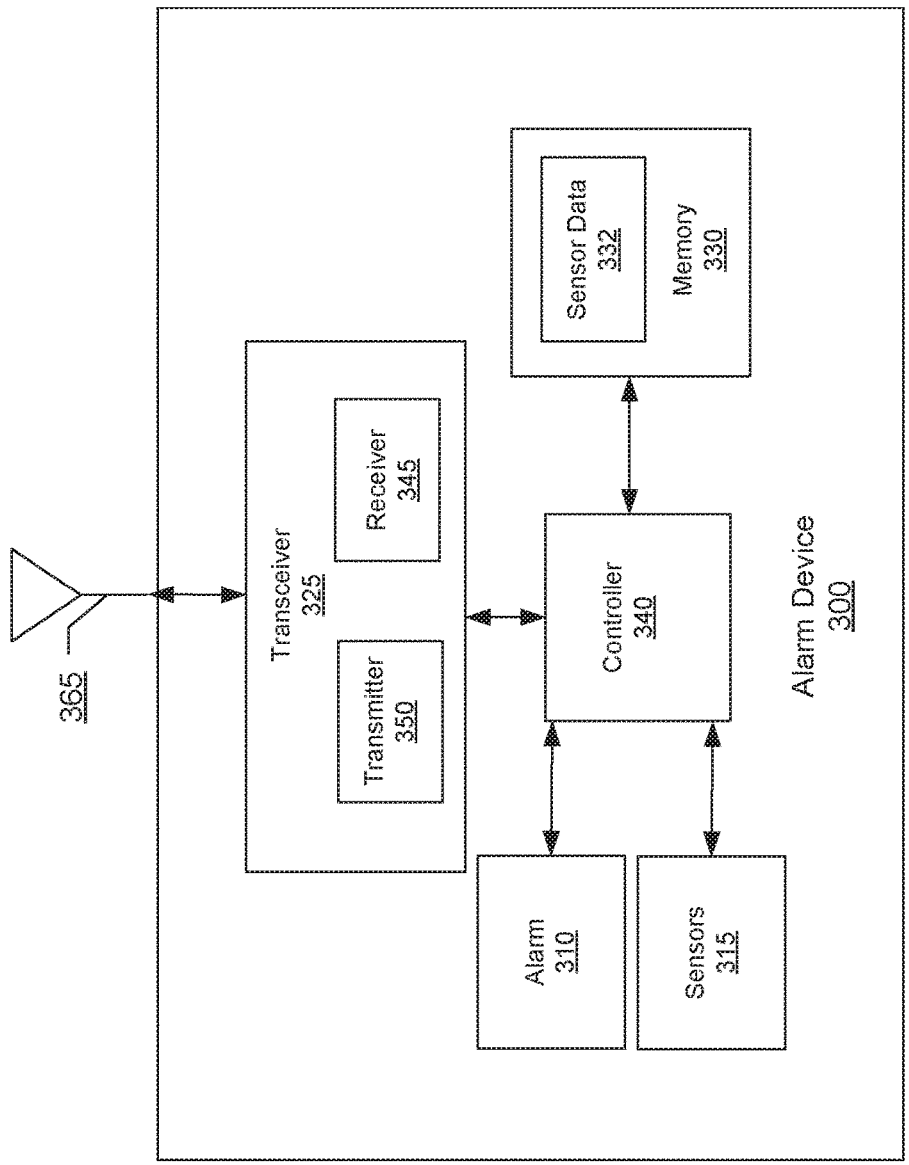
FIG. 3 is a block diagram of a user alarm device according to some embodiments of the present invention.

As illustrated in FIG. 2, the monitoring station 200 includes a user interface 210, a transceiver 220, a memory 230 and a controller 240. The transceiver 220 may be a wireless transceiver and may include a receiver 245 and a transmitter 250, which may be coupled to an antenna 265. The transceiver 220 is configured to establish a wireless connection, e.g., with the alarm devices 300 and/or a network. As illustrated in FIG. 3, the alarm device 300 includes an alarm indicator 310, sensors 315, a transceiver 320, a memory 330 and a controller 340. The transceiver 320 may be a wireless transceiver and may include a receiver 345 and a transmitter 350, which may be coupled to an antenna 365. In some embodiments, the wireless connection between the monitoring station 200 and the alarm devices 300 is a radio frequency (RF) connection; however, any suitable wireless connection may be used, including cellular telephone connections, a Bluetooth® connection, a wireless local area network connection (e.g., 802.11), ultrasonics and the like. The monitoring station 200 and the alarm devices 300 may be configured to communicate data therebetween over a direct wireless communication interface or over another wireless communication interface through another device, such as a cellular base station or wireless local area network (WLAN) router.

As illustrated in FIG. 1, status updates, including data from the sensors 315 and/or position information for the devices 300, may be communicated by the alarm devices 300 to the monitoring station 200. If a triggering event occurs, such as a loss of communication, the monitoring station 200 selects one of a plurality of alarm protocols. The alarm protocol is conveyed to a user, for example, on the user interface 210 illustrated in FIG. 2. The user interface 210 of the monitoring station 200 may be any suitable user interface, such as a touch sensitive screen, a keypad, a joystick or other user interface and may include display features for displaying information (e.g., a display screen or an indicator light for a given alarm level), a speaker for indicating an auditory alarm, and/or a vibration feature for vibrating a mobile alarm 202. Accordingly, the user interface 210 is configured to communicate alarm information through any suitable user interface.

The sensors 315 of the alarm device 300 may include sensors for detected environmental conditions of the alarm device 300. For example, the sensors 315 may include accelerometers, moisture/water sensors, temperature sensors, position sensors, inductive capacitance sensors, ultraviolet radiation sensors, depth gauges and the like for detecting whether the device 300 is wet, dry, moving, or still. In particular embodiments, a charging port may also be configured as a sensor 315 so that when the charging port having two electrical terminals is wet, the corresponding change in conductivity between the charging ports secondary to water and not air bridging the contacts is detected by the device 300. In some embodiments, the sensor 315 may provide data as a state (e.g., wet or dry, moving or still); however, a quantitative value may also be measured by the sensors 315 (e.g., velocity, location, distance from the monitoring device 200, and the like). The memory 330 may include data, such as sensor data 332, including information recorded by the sensors 315 regarding the environmental conditions of the alarm device 300.

Figure 4:
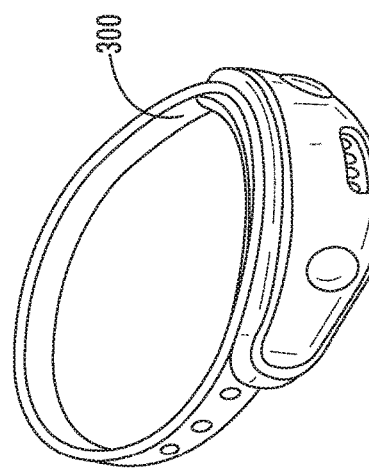
FIG. 4 is an illustration of a user alarm device according to some embodiments of the present invention.

As illustrated in FIG. 4, the user alarm device 300 may be configured as a necklace or other wearable device. In some embodiments, the device 300 is a buoyant necklace that generally floats when the wearer's head is above water and becomes submerged when the wearer's head is under water. Suitable alarm device configurations are discussed is U.S. Pat. No. 7,554,453, the disclosure of which is hereby incorporated by reference in its entirety.

Figure 5:
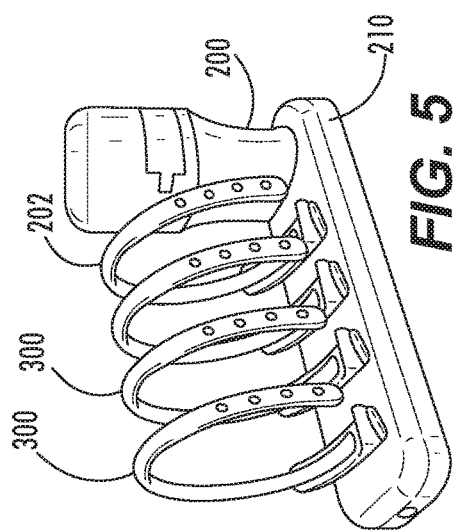
FIG. 5 is an illustration of a monitoring and recharging station having a plurality of user alarm devices and/or portable monitoring devices attached thereto according to some embodiments of the present invention.
Figure 7:
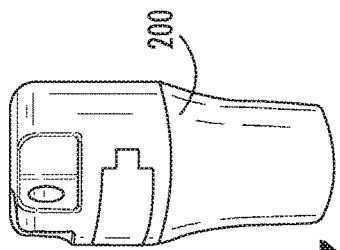
FIG. 7 is an illustration of another portable monitoring unit according to some embodiments of the present invention.
Figure 6:
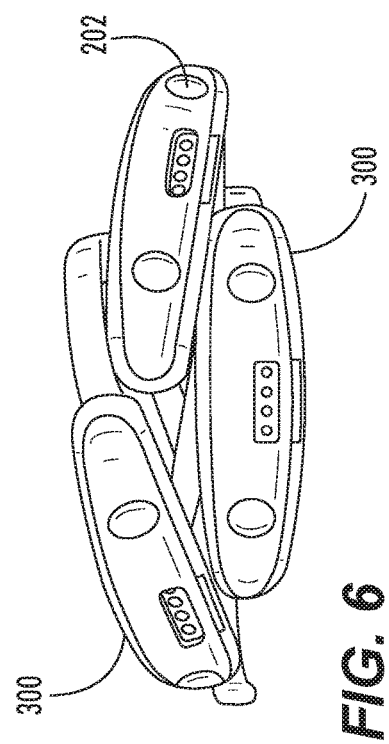
FIG. 6 is an illustration of a plurality of user alarm devices and/or portable monitoring devices according to some embodiments of the present invention.
Figure 8:
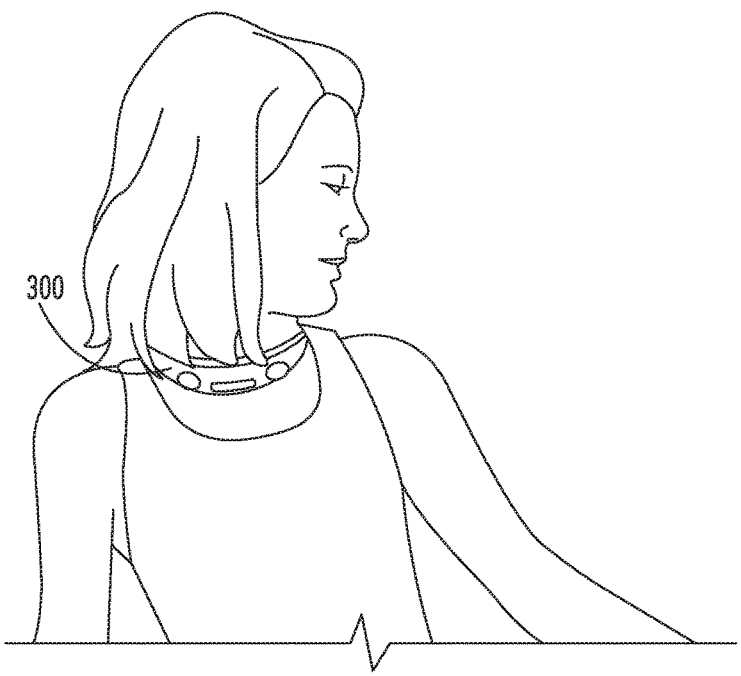
FIG. 8 is an illustration of a user alarm device being worn by a user/swimmer according to some embodiments of the present invention.
Figure 9:
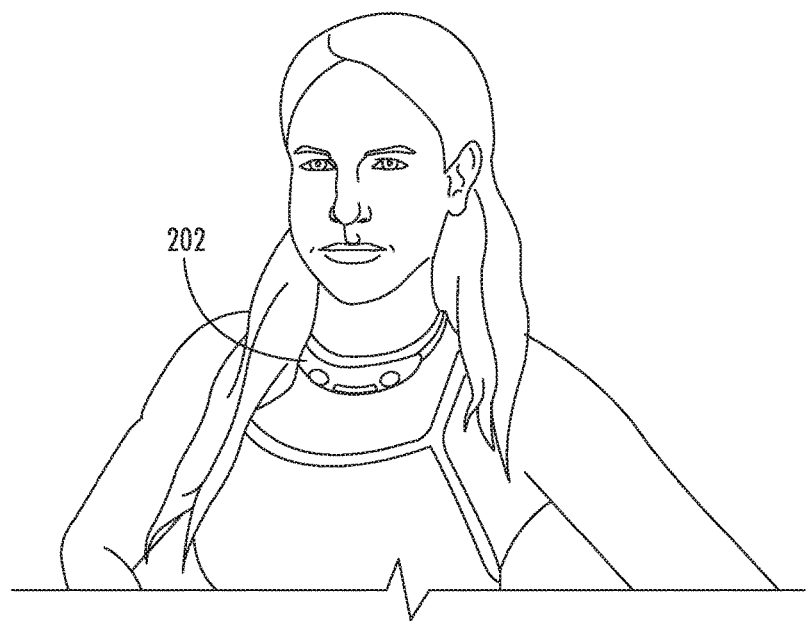
FIG. 9 is an illustration of a portable monitoring unit being worn by a user such as a lifeguard according to some embodiments of the present invention.
Figure 10:
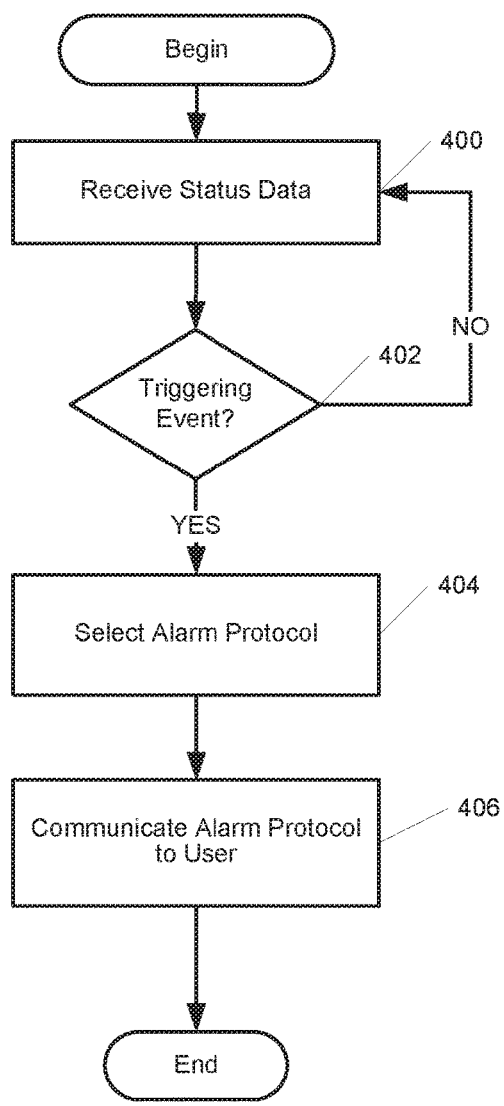
FIGS. 10-12 are flowcharts illustrating operations according to some embodiments of the present invention.

As shown in FIG. 5-6, the monitoring station 200 may include recharging outlets such that a plurality of user alarm devices 300 and/or portable monitoring units 202 may be recharged on the monitoring station 200. The portable monitoring units 202 may be sized and configured similarly to the alarm devices 300; however, the portable monitoring units 202 are electronically programmed and designed to be worn by a lifeguard or other adult to issue an alert, such as a vibration, sound, and/or light alarm when one of the alarm devices has a triggering or drowning event. In addition, the user alarm devices 300 may each have a unique identifier such that the monitoring station 200 detects when a particular device 300 is plugged into the monitoring station 200 and, consequently, not in use. Although the portable monitoring unit 202 is illustrated as a necklace-shaped device, it should be understood that any suitable shape may be used, including arm bands or handheld devices. For example, a smartphone or tablet may be programmed to carry out the operations of the portable monitoring unit 202 and communicate with the monitoring station. As shown in FIG. 7, the hub or monitoring station 200 may be a portable device capable of producing lights, sounds, vibrations or other alerts. The monitoring station 200 and/or the portable monitoring unit 202 may include a display or other indicator, such as a light, sound or vibration alarm, to indicate when the monitoring station 200 has detected alarm conditions from one of the alarm devices 300 and information about the alarm, such as which alarm device 300 is activating the alarm or the location of the device 300. The alarm devices 300 or portable monitoring devices 202 may be configured to be worn around the user's neck as shown in FIGS. 8 and 9.

As illustrated in FIGS. 1-3 and 10, the monitoring station 200 is configured to receive status data from a plurality of alarm devices 300 (Block 400). For example, the monitoring station 200 may initiate a data request from the alarm devices 300 periodically, such as three to five times every second, once every second, once every 10 seconds, or once every 30 seconds. The alarm devices 300 may respond to the request by providing the sensor data 332 to the monitoring station 200, and the sensor data 332 is stored as status data 232 in the memory 230. In some embodiments, the position of the alarm device(s) 300 may also be recorded in the status data 232, for example, using signal triangulation techniques, a global positioning device (GPS) or a local GPS.

When the monitoring station 200 detects a triggering event (Block 402), then the monitoring station 200 selects an alarm protocol (Block 404) from a plurality of possible protocols. An alarm protocol is based on possible user states corresponding to the alarm devices 300, such as a possible drowning event or a less serious event, such as a user leaving a pool area while wearing the alarm device 200. The selected alarm protocol is then communicated to the user, such as a life guard, parent or other supervisor (Block 406). In particular, a triggering event (Block 402) is generally an event that indicates an alarm may be issued. In some embodiments, a triggering event occurs if the monitoring station 200 queries an alarm device 300 for the sensor data 332, but receives no response or a low signal indicating that the alarm device 300 may be either out of range or under water, and the lack of response or low signal is received for a predetermined period of time. For example, RF signals may be used to communicate between the monitoring station 200 and the alarm device 300; however, RF signals travel poorly in water at certain depths. The devices 300 may be tuned so that they can effectively transmit between 2 and 12 to 16 inches of water. Transmission through deeper water may not be desirable because the depth may indicate a drowning event, and consequently, the transmissions may be tuned so that RF signals are curtailed at greater than between 2 and 16 inches of water, which in turn signals the alarm. In particular embodiments, a 915 MHz transmitter is used to transmit RF signals from 1-6 inches under water from 100 to 800 feet depending on tuning and power. The devices 300 can be tuned to transmit in higher or lower depths by adjusting the power, the frequency, and the resonance configurations of the transceiver 320 and/or antenna 365 in such a way as to make the water transmission depths vary. For example, a more advanced or older swimmer may have a device 300 that is preprogrammed to transmit through deeper water than a less advanced or younger swimmer. In some embodiments, the transceiver 320 and/or the antenna 365 may be tuned by inputting a selection for a depth (or swim proficiency level that corresponds to a desired depth of transmission) and characteristics of the water, such as pool saline, chlorine, fresh water, or ocean salt water. The device 300 may automatically select settings for the power, frequency and/or resonance configurations in response to a desired depth or swim proficiency level and the characteristics of the water, e.g., based on settings or a look-up table that are stored in the device 300. In some embodiments, RF transmission signals may be sent periodically between the devices 300 and the monitoring station 200 and any abnormalities or triggering events, such as a lack of RF signal for a predetermined time, may be registered by the monitoring station 200. The RF transmission signals may originate in either the alarm devices 300 or the monitoring station 200. In particular embodiments, the monitoring station 200 transmits RF signals to the alarm devices 300 in a serialized or other protocol and receives a return signal indicating proper receipt of the RF signal by the alarm devices 300, which may reduce interference of signals from the alarm devices 300.

If the monitoring station 200 cannot communicate using RF signals with the alarm device 300 for more than a predetermined period of time (e.g., 10-60 seconds), then the controller 240 detects a triggering event (Block 402). Accordingly, the status data (Block 400) may include an indication of whether the alarm device 300 is in contact with the monitoring station 200. In some embodiments, additional sensor data 332 from the sensors 315 (FIG. 3) may be omitted, and the triggering event may be detected (Block 402) in response to the indication of whether the alarm device 300 is in contact with the monitoring station 200. Thus, the communication link or signal between the alarm device 300 and the monitoring station 200 may be a communication signal that has a finite range and/or travels poorly in deep water, such as an RF signal. Receiving the status data (Block 400) include sending a message or other signal to determine whether the alarm device 300 and the monitoring station 200 are in communication with one another, such as by using a "ping" test. In addition, a time delay of the response or power level of the signal may also be used to approximate the distance between the alarm device 300 and the monitoring station 200. If the alarm device 300 and the monitoring station 200 are not in communication with one another for a predetermined amount of time, then the triggering event may be identified (Block 402). The predetermined amount of time may be based on how long a swimmer may be safely submerged and may account for different swimming abilities to reduce the number of false alarms.

Additional triggering events include unauthorized removal of the device 300, such as by removal of a connector such as a neck band, which may or may not reset the triggering event if the band is reattached. The removal of the connector may be detected, e.g., by an electrical conduction or hall switch connected to a band or clasp that breaks a circuit when disconnected. Resetting of the alarm status may be by push button, a preprogrammed code, or through physical contact of the device 300 to the monitoring station 200. In some embodiments, when an alarm device 300 is activated and a triggering event sounds an alarm, the only way to reset the device 300 is by forcing that swimmer to get out of the water and touch the monitoring station 200 (i.e., to ensure that the child gets out of the pool). This deactivation could be by using a physical, magnet, or near field radio transmission to indicate the presence of the swimmer by the station 200.

It should be understood that various triggering events may be defined by the monitoring station 200 and/or alarm devices 300 and are within the scope of the present invention. Other exemplary triggering events include determining if a swimmer is in distress through prolonged submersion, abnormal vitals signs, abnormal blood oximetry, co-oximetry or chemistry, abnormal movements, or other signs of drowning. Accordingly, the sensors for detecting a triggering event may include a co-oximeter, a pulse oximeter, or other sensors that may be worn by the swimmer. Thus, the sensors may include a measurement of vital signs, such as may be provided by wearable optical sensors, acoustic sensors, electrical sensors and/or other sensors known to those of skill in the art. The sensor(s) may measure optical, electrical, and acoustic waveforms from the swimmer, which the monitoring station 200 and/or the device 300 then analyzes to determine vital sign parameters that may initiate a triggering event. The triggering event may include issuing a warning status, e.g., when a swim time (or time during which the device 300 is wet) is exceeded. In systems with multiple monitoring stations 200 configured to monitor various regions (e.g., a pool of a particular depth) a triggering event may include when a device 300 moves from one monitoring station 200 to another. Moreover, in some embodiments, a fault signal (such as a loss of power) from either the monitoring station 200, monitoring devices 202 or one or more of the devices 300 may cause a triggering event in the other devices 300 and/or monitoring station 200 or devices 202.

In particular embodiments, the triggering event may be a signal pattern that may be indicative of drowning. For example, as illustrated in FIGS. 14A-14D, the alarm device 300 may generate a signal, and the monitoring station 200 (not shown) may receive the signal from the device 300. The strength of the signal received by the monitoring station 200 from the device 300 may be generally proportional to the depth of water in which the device 300 is submerged. For example, the device 300 may generate a radio frequency (RF) signal, and the strength of the RF signal may be reduced when the RF signal is generated under water. The amount of signal reduction may be generally proportional to the depth of the water in which the device 300 is submerged. In some embodiments, the RF signal may travel a relatively large distance, such as a 1600 foot diameter area or more and penetrate several feet of water. The triggering event may include the RF signal strength alone or together with other parameters, such as information from the sensors 315, e.g., depth information from a depth gauge. For example, a triggering event may occur when the device 300 is submerged for a predetermined time at a water depth that is sufficient to significantly reduce or eliminate the signal strength received by the monitoring station 200, such as may be caused at a depth of greater than four or six feet. A triggering event may also occur when the signal strength is reduced and/or a depth gauge on the device indicates that the device 300 is submerged (e.g., under more than two feet of water) for longer than a predetermined time. Accordingly, the depth information from a depth gauge may be used alone or in combination with the RF signal strength. Moreover, the depth information from the depth gauge and other information from the sensors 315 may be transmitted by the RF signal.

In particular embodiments, the triggering event may be a characteristic modulation of signal strength that is consistent with drowning. For example, an instinctive drowning response may be seen prior to a drowning event that includes a characteristic bobbing. Without wishing to be bound by any particular theory, when a struggling swimmer strains to keep his or her head out of the water, the swimmer will typically become exhausted and then sink. When the swimmer is submerged, he or she becomes afraid and attempts to get his or her head above water prior to sinking again. This process may be repeated until the swimmer becomes completely exhausted and drowns, and the swimmer may be too exhausted to speak or cry for help. The characteristic behaviors of drowning may be referred to as the Instinctive Drowning Response. See Frank Pia, "Observations on the Drowning of Nonswimmers," Journal of Physical Education (1974). The duration of the Instinctive Drowning Response may be about 20 seconds to about 60 seconds. Unfortunately, this bobbing action that is characteristic of drowning is difficult for untrained observers to recognize and may even appear to be a game or playful behavior. In some cases, children and adults have drowned while people were actually looking at them, but not understanding that they were near drowning. Accordingly, the triggering event for a drowning alarm according to some embodiments may include the modulation of the signal strength from the device 300 as it is received by the monitoring station 200 in such a pattern that indicates a possible drowning or pre-drowning event.

Figure 14:
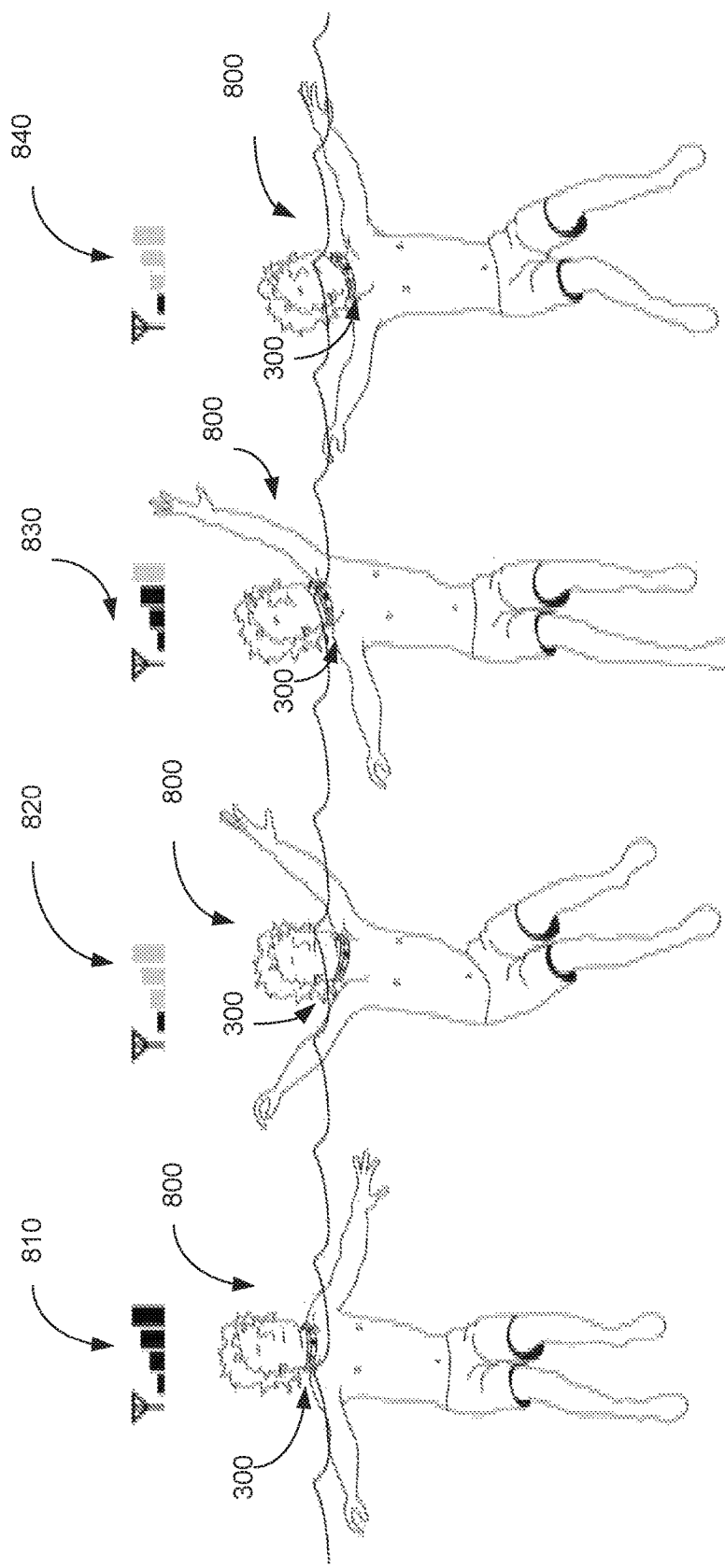
FIGS. 14A-14D illustrate a swimmer wearing an alarm unit and an associated characteristic signal strength of the alarm unit.

Examples of signal modulation that may indicate a drowning or pre-drowning event include a bobbing pattern as illustrated sequentially in time in FIGS. 14A-14D. FIGS. 14A-14D illustrate a swimmer 800 and four associated signal strengths 810, 820, 830 and 840 over time. As illustrated in FIG. 14A, the swimmer 800 is able to position the device 300 above the water, and the signal strength 810 received by the monitoring station 200 is high. The swimmer 800 then sinks under the water in FIG. 14B, and the signal strength 820 is reduced. The swimmer 800 pushes himself back above the water in FIG. 14C, and the signal strength 830 is increased. The signal strength 830 is slightly less than the signal strength 810 because the swimmer 800 is becoming more tired over time and cannot get all the way up to the surface. The swimmer 800 sinks again in FIG. 14D, and the signal 840 decreases.

Figure 15:
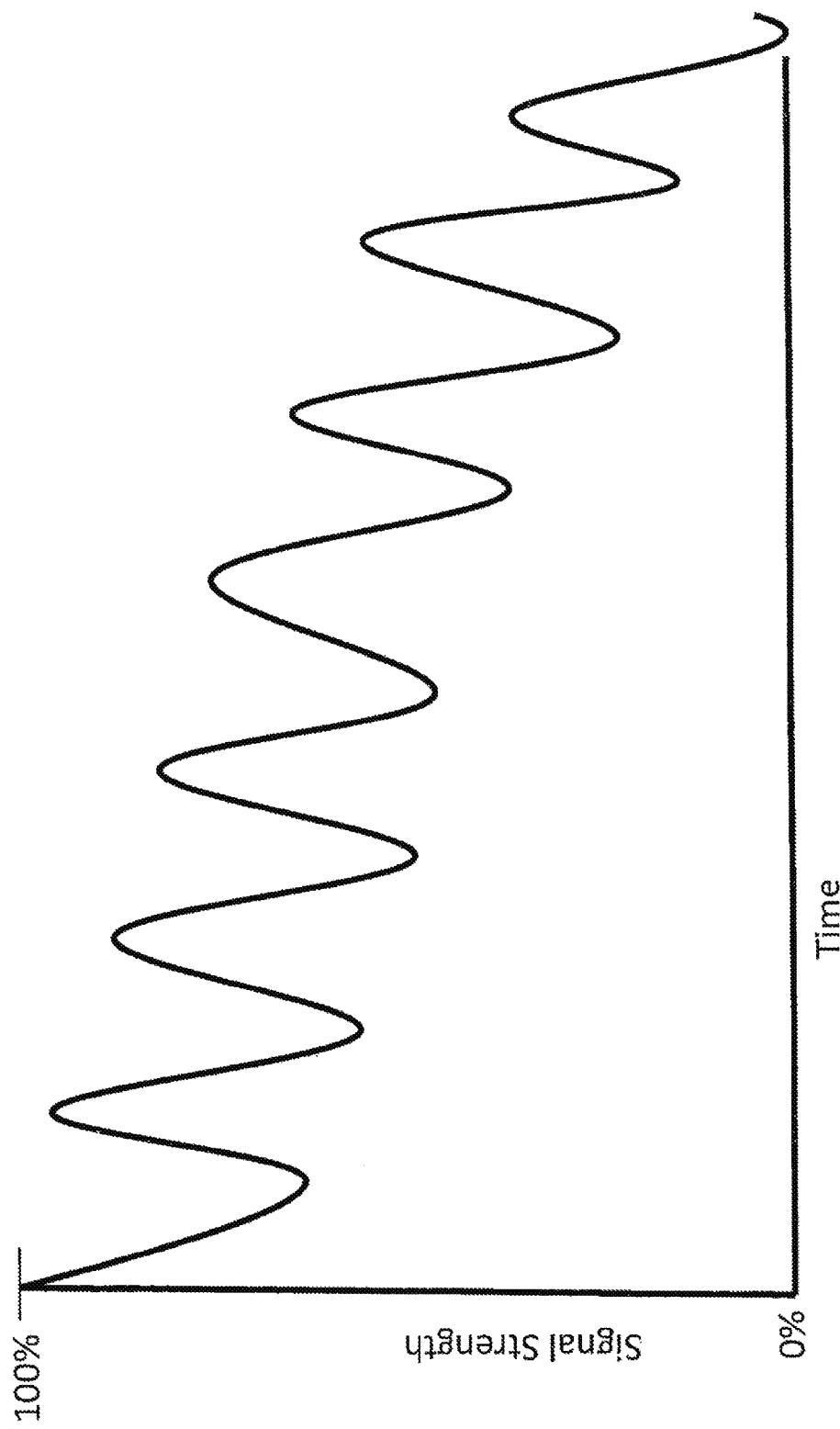
FIG. 15 is a graph of a signal strength of an alarm device over time that may indicate a drowning or pre-drowning event.

In some cases, the signal modulations that indicate drowning or pre-drowning events may be characterized by a high signal strength that is reduced in a generally sinusoidal or oscillating signal pattern that may generally decrease over time, for example, as illustrated in FIG. 15. By "generally oscillating signal" or signal profile, it is meant that the signal strength oscillates with either a regular or irregular frequency and may include a general trend of decreasing signal strength over time as illustrated in FIG. 15. The frequency of oscillation may be between about once every 3.0 seconds to about once every 0.5 seconds and may also increase and/or decrease over time. The rate or pattern of immersion of the device 300 may therefore be used to identify a potential drowning event or risk of drowning if the rate of immersion rate or pattern is within predefined parameters that indicate a likelihood of drowning or pre-drowning. In some embodiments, a signal pattern such as described in FIGS. 14A-14D and FIG. 15 may be used to define a triggering event for an alarm that is based on behavior common to drowning so that an alarm may be more rapidly initiated before the swimmer sinks under water to improve the chances for a successful rescue. Accordingly, when a generally oscillating or sinusoidal signal having predefined parameters consistent with drowning or pre-drowning behavior is received by the monitoring station 200, the monitoring station 200 identifies/detects a triggering event.

Figures 11, 12:
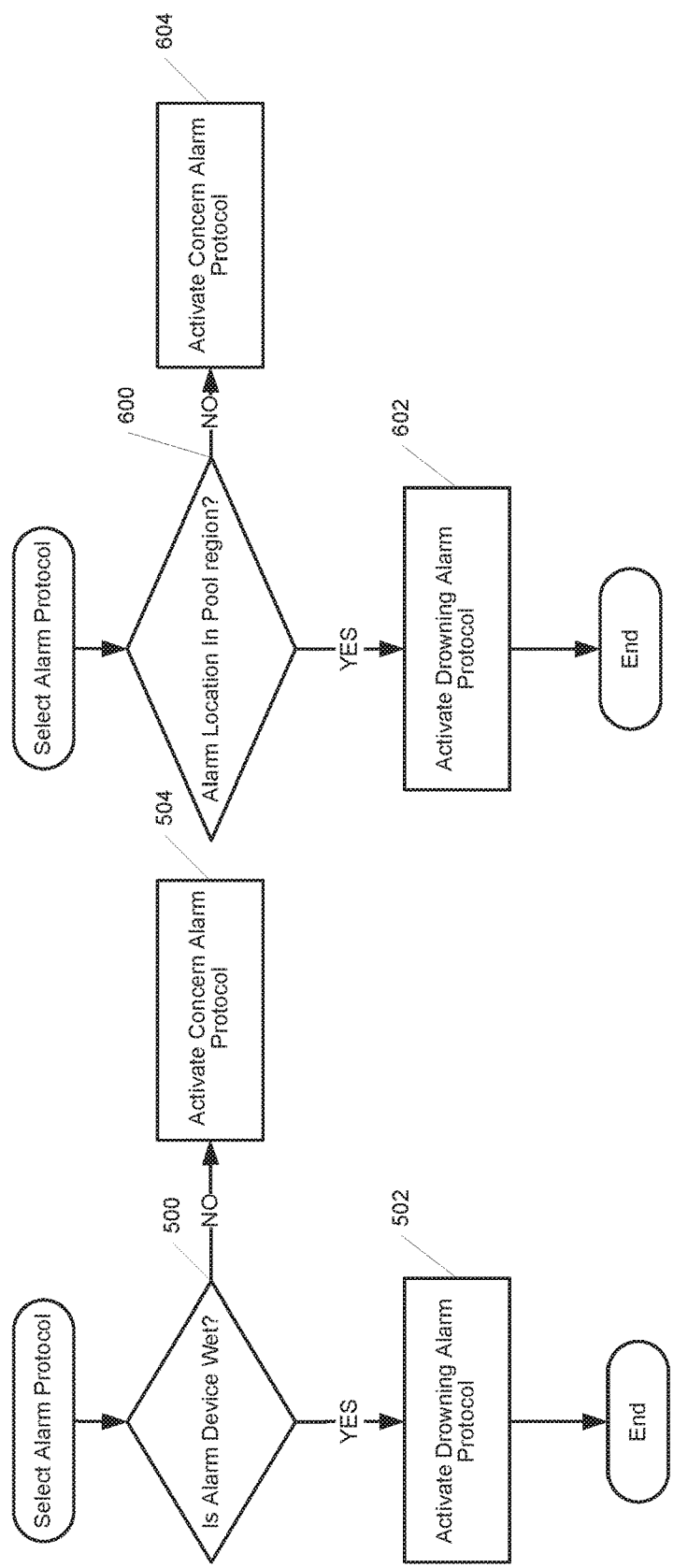

Upon detection of such a triggering event, the controller 240 analyzes the status data 232 to determine a likely status of the alarm device 300 to select an alarm protocol (Block 404). For example, as illustrated in FIG. 11, if the alarm device 200 was wet for a period of time generally immediately before the triggering event occurred, (Block 500), then a drowning alarm protocol is activated (Block 502). A drowning alarm protocol may include visual, audible, and/or vibration alarms to alert a lifeguard or other caretaker that one of the alarm devices 300 is indicating a serious event. Moreover, different visual, audible, vibration or other alarms may be used to differentiate and identify a particular situation and/or provide instructions for a possible response. In some embodiments, the monitoring station 200 provides instructions to one or more of the alarm devices 300 as part of the alarm protocol. For example, the monitoring station 200 may locate all of the alarm devices 300 that are in a region adjacent the location of the alarm device 300 that had the triggering event, and the monitoring stations 200 may transmit an indication of proximity to the alarm device 300 that has sounded the alarm (e.g., a light color, vibration, or other indication that the users of the devices 300 should look for a swimmer in trouble). In addition, the lifeguards or other caretakers may ask other swimmers to get out of the pool so that they can more easily locate the alarm device 300 that sounded the alarm. In some embodiments, more than one type of communication protocol may be used by the alarm device 300. For example, the lack of an RF signal may be used to trigger an alarm protocol; however, the device 300 may also include an ultrasonic transmitter that may be used to locate the device underwater using a hydrophone.

If the sensor data 332 indicates that the alarm is not wet (Block 500), then the monitoring station activates a concern alarm (Block 504). For example, the user of the alarm device 300 may have left the pool area so that the communication link between the alarm device 300 and the monitoring station 200 is broken. Although this is still a concern, the alarm level may be less than in the case of a possible drowning event. The status data 232 may indicate a location where the alarm initiating device 300 was last detected, and this information may be conveyed to the user via the user interface 210. The status data 232 may indicate how far the alarm device 300 was located from the monitoring station 200 based on the last received signal from the alarm device 300.

As indicated in FIG. 12, after a triggering event is received, the sensor data 232 may be used to determine if the last detected alarm device location was in the pool region (Block 600). If the alarm device location was in the pool region, then a drowning alarm protocol is activated (Block 602) as described above. If the last alarm location was not in the pool region, then a concern alarm may be activated (Block 604) as described above.

Although embodiments according to the present invention are described herein with respect to drowning alarm protocols and concern alarm protocols, it should be understood that the status data 232 may be used to identify other alarm protocols. For example, indications may be provided when an alarm device 300 has a low battery signal or when the alarm device 300 is detached from the child (e.g., a tether such as a necklace holding the device 300 is detached). As another example, if the monitoring device 200 fails, the failure may be communicated by the alarm devices 300, e.g., by changing a color or by other indicia. Moreover, the status data 232 may be used to analyze the conditions after an alarm occurs. For example, a portable monitoring device 202 may include a water sensor so that the monitoring device 200 may record the time that the alarm was activated and the time when the user of the portable device 202 (such as a lifeguard) entered the water. The status data 232 may also be used to record how long a device 300 was submerged, the locations of all the users, how crowded the pool was, and what the users who were not involved in the incident were doing at the time of an incident. Portable devices 202 may be configured to only receive alarm information for some of the alarm devices 300, for example, so that parents may monitor their children without monitoring all of the devices 300 in a pool. In some embodiments, a portable device 202 may be used to communicate with one or more of the alarm devices 300, for example, with a vibration or colored light that indicates an action, such as getting out of the pool, should be taken.

Moreover, the triggering events may be predefined and/or may by modified based on global conditions of the environment of the monitoring device 200 and the alarm devices 300. For example the global condition parameters may be defined by status data from the alarm devices 300, such as and may be modified over time by a change in status data from the one or more alarm devices. For example, immersion rates or other sensor/status data of the alarm devices 300 may be used to determine that the alarm devices 300 are being used in a swimming class or practice in which the users are swimming laps or diving. Thus, the triggering events for a potential drowning event may be defined differently than with a recreational swimming use. In addition, the global conditions that may be used to modify the parameters for a triggering event may include a number of swimmers, an age of the swimmers, a swimming proficiency of the swimmers and/or a predefined activity of the swimmers (e.g., a type of swimming instruction, a game and/or a free swim). Moreover, the monitoring device 200 may be configured to assign condition parameters to each of the one or more alarm devices such that the triggering events for some of the one or more alarm devices is different from other alarm devices.

Although embodiments of the present invention are described with respect to a monitoring device 200, it should be understood that more than one monitoring device may be used in a system to provide coverage for more than one region, such as different pool areas or different life guarding units. Alarm devices 300 may communicate with one or more monitoring devices 200 and/or the monitoring devices 200 may be assigned to a subset of the alarm devices 300 and/or "hand off" the alarm devices 300 as a user moves from one region to another.

Figure 13:
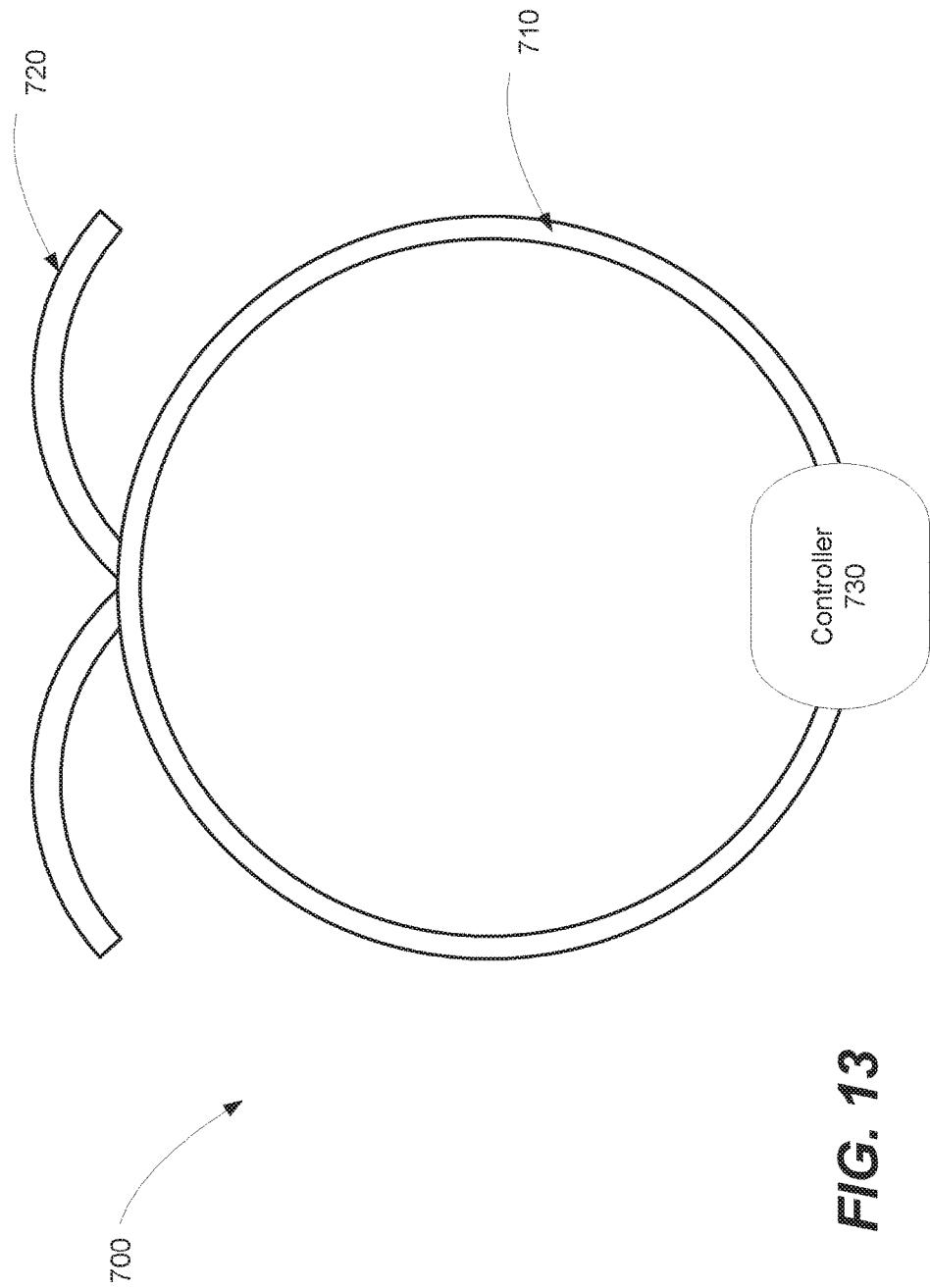
FIG. 13 is a side view of an alarm device having a buoyant antenna side and a controller side according to some embodiments of the present invention.

In some embodiments, an alarm device may include a buoyant antenna. For example, as illustrated in FIG. 13, an alarm device 700 includes a user attachment, such as a necklace 710, an antenna 720 and a controller 730. The antenna 720 may include a buoyant housing that is configured to float during use. The controller 730 may include a housing that encloses at least portions of the alarm device electrical circuits and functions, such as the circuits illustrated in FIG. 3. The necklace 710 may include a conduit or wire connecting the controller 730 to the antenna 720. In this configuration, the buoyant antenna 720 may float on the water during use, and the weight of the controller 730 may further bias the alarm device 700 so that when a user who is wearing the necklace 710 is swimming, the controller 730 faces into the water, and the antenna 720 faces in a direction out of the water. Accordingly, the antenna 720 is more likely to be positioned such that the antenna 720 is able to transmit a signal from either above the water or at the surface of the water during normal use. In addition, the weight of the controller 730 generally does not interfere with the ability of the antenna to transmit a signal, and the weight of the control 730 may push the antenna 720 towards the water surface during normal use. For example, if the antenna 720 is an RF antenna, then the antenna 720 may transmit a stronger signal from above the water or from the water's surface to indicate that user is not drowning. However, if the user is submerged, then the buoyant antenna 720 may also submerge, which decreases or eliminates the signal from the antenna 720 to a monitoring device (e.g., the monitoring device 200). In some embodiments, the buoyant antenna 720 may include a buoyant material, such as Styrofoam®, or an air chamber to increase buoyancy.

In some embodiments, the alarm devices 300 may be programmed to operate as one of the portable monitoring devices 202 and the portable monitoring devices 202 may be programmed to operate as one of the alarm devices 300, for example, by using a preprogrammed setting or mode of operation. The alarm devices 300 may be programmed to reflect the same information received by the monitoring station 200, by the portable monitoring devices 202 that are generally worn by lifeguards, e.g., to indicate warning levels such as red alarms or yellow warnings of swimmers in the pool. This programming can be achieved by the user pressing a button or attaching a custom "guard" face plate to the device 200.

As illustrated in FIGS. 8-9, in some embodiments the monitoring device 202 is worn around the neck or other location so that it is either impossible or difficult to be viewed by the guard themselves, reducing or preventing the temptation to be distracted and stare at the monitoring device 202 instead of the pool or water area.

In some embodiments, an accelerometer is provided in the monitoring device 202 such that the monitoring device 202 can be programmed to send a reminder beep or chirp when the wearer or guard is not moving or only minimally moving secondary to respirations (e.g., sleeping or daydreaming).

In some embodiments the portable monitoring unit 202 and the device 300 will float in an orientation maximizing the elevation of the antenna as illustrated in FIG. 13.

In some embodiments the triggering event includes a disconnection of the device 300 or a connecting member, such as a necklace or other tether, from the swimmer, and an absence of reattachment within a predefined time period.

In some embodiments, the monitoring device 200 may be configured for open water use, for example, by attaching the monitoring device 200 to a buoy or other floating device.

The triggering event may be a reduction in signal strength from the alarm device or unit 300 to below a threshold level, which may indicate that the alarm unit 300 is either out of range or under the water. In some embodiments, the monitoring station 200 may determine whether the reduction or loss in signal strength is because the alarm unit 300 is out of range or under water.

Figure 16:
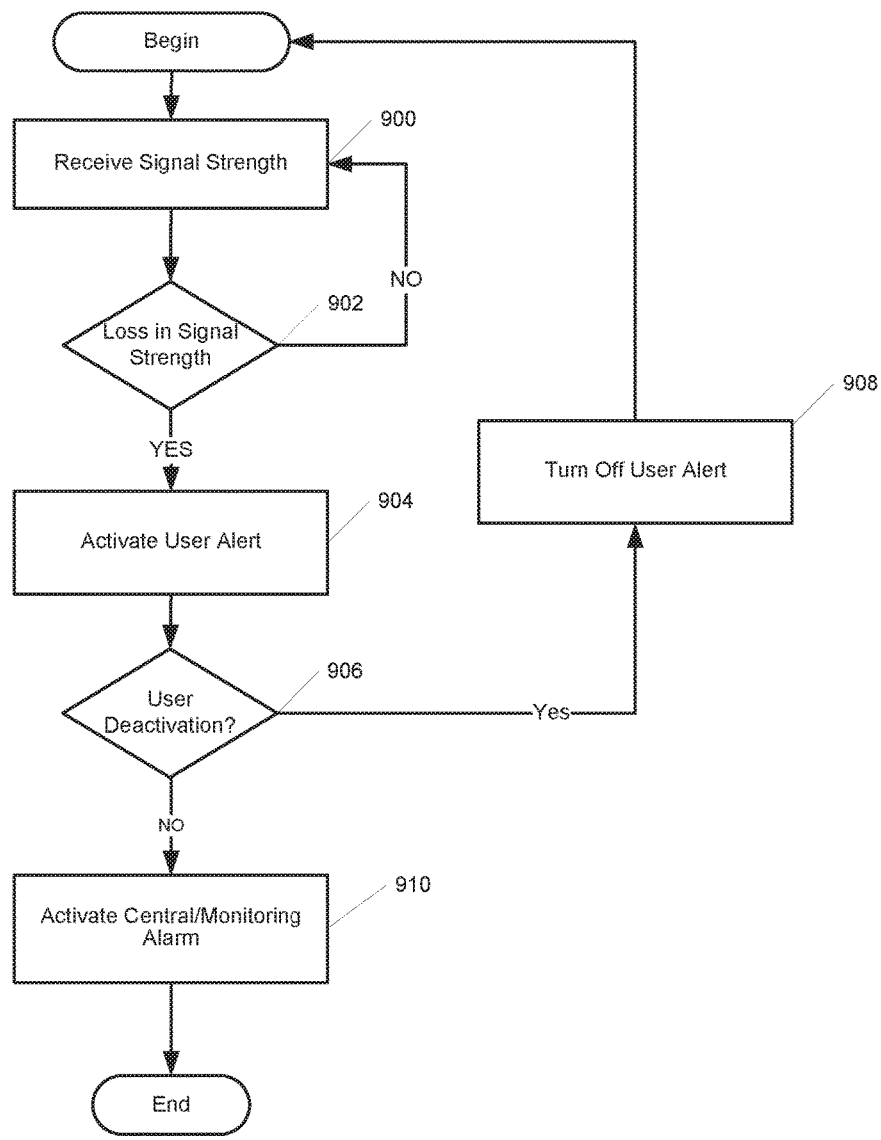
FIG. 16 is a flowchart illustrating operations according to some embodiments.
Figure 17:
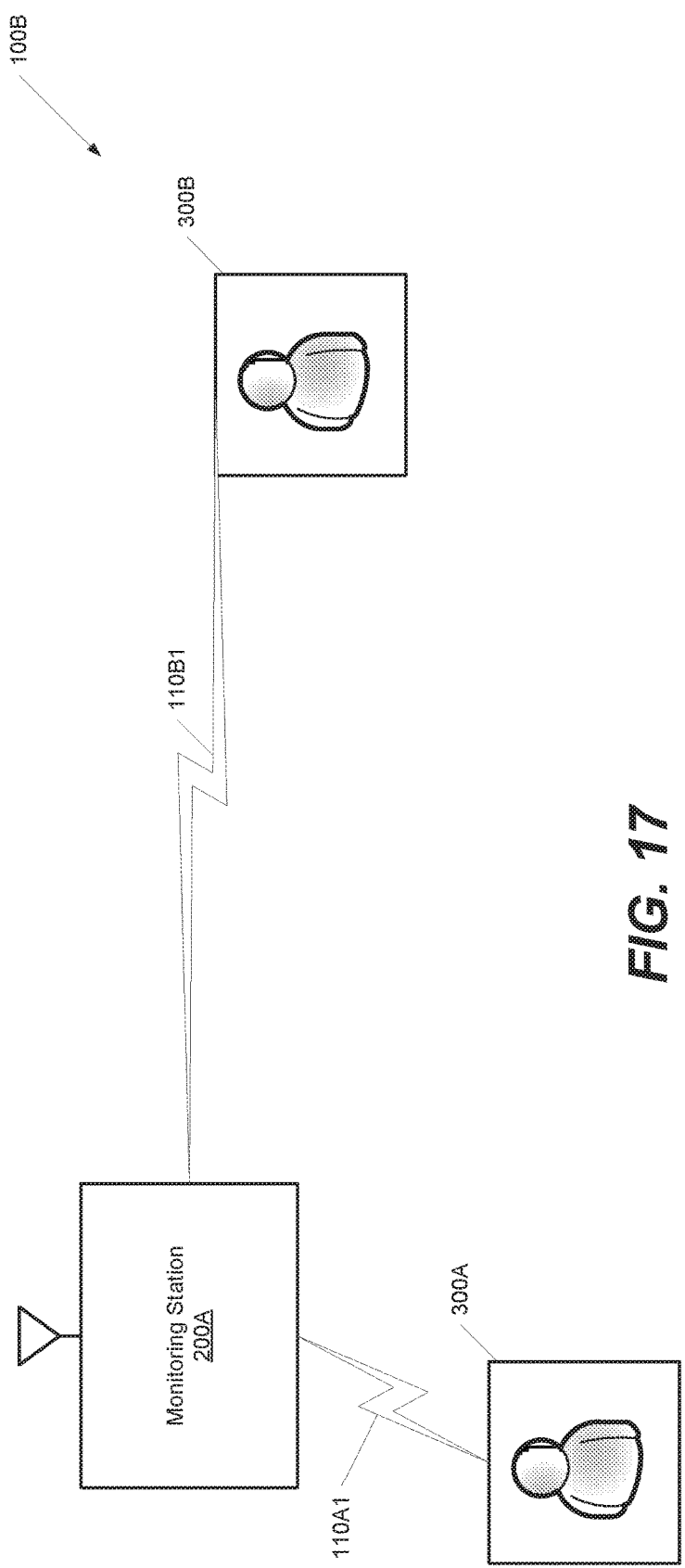
FIG. 17 is a schematic diagram of a monitoring system according to some embodiments.

For example, as illustrated in FIGS. 16-17, the monitoring station 200A may receive signals 110A, 110B, such as an RF signal, from the alarm devices 300A, 300B (Block 900). As illustrated, the alarm device 300B is furthest from the monitoring station and the signal 110B from the alarm device may be sufficiently weak to indicate either a drowning event or that the swimmer is leaving the pool area (Block 902). An alarm protocol from the monitoring station 200A issues an alert to the alarm unit 300B that has the loss of signal strength (Block 904). The user alert can be an observable alert at the alarm device 300B, such as a vibration, an alarm noise, or other output that may attract the swimmer's attention. The alarm device 300B may include a deactivation mechanism, such as a button, and if the swimmer/user is able to deactivate the user alert at the alarm unit, for example, by pressing an appropriate button (Block 906), then the user alert is turned off and the alarm is not sent to the monitoring station 200A (Block 908). The monitoring station 200A is not activated because if the user is capable of deactivating the device, he or she is likely moving out of range and not drowning or under water. However, if the user is not capable of turning off the user alert and/or does not deactivate the user alert, for example, after a given amount of time such as 10, 15, 20, or 30 seconds (Block 906), then the central monitoring station 200 is activated (Block 910).

In this configuration, a user alert at the swimmer's alarm device 300B may be used to alert the user that they are out of range instead of issuing a drowning alarm at the central monitoring station 200A. In some embodiments, the user alert may be reactivated if the user does not return the alarm device 300B to a central location, such as the monitoring station 200A. This may reduce a likelihood and prevent a swimmer from accidentally leaving a pool area with the alarm device 300B.

Figure 18:
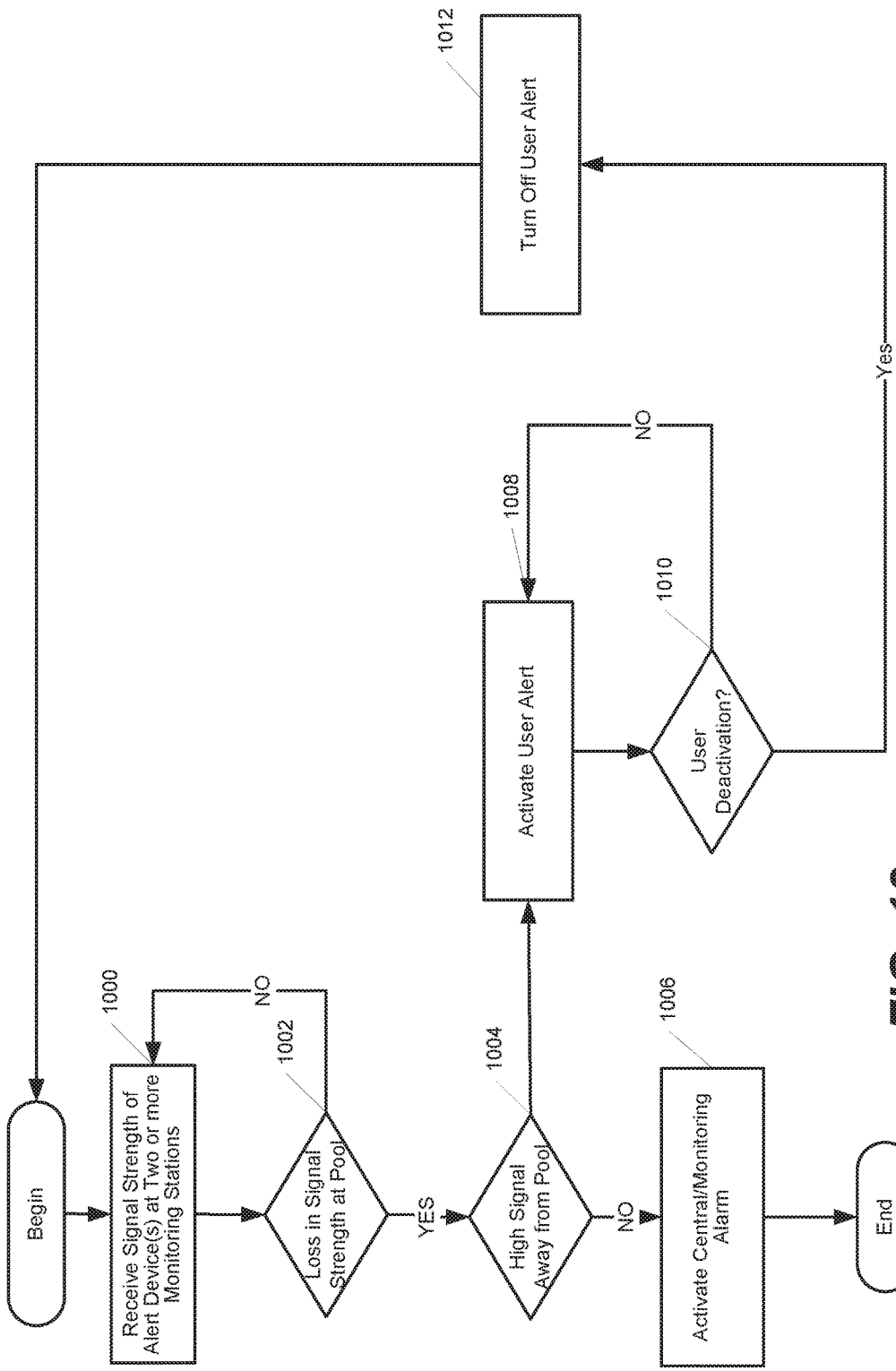
FIG. 18 is a flowchart illustrating operations according to some embodiments.
Figure 19:
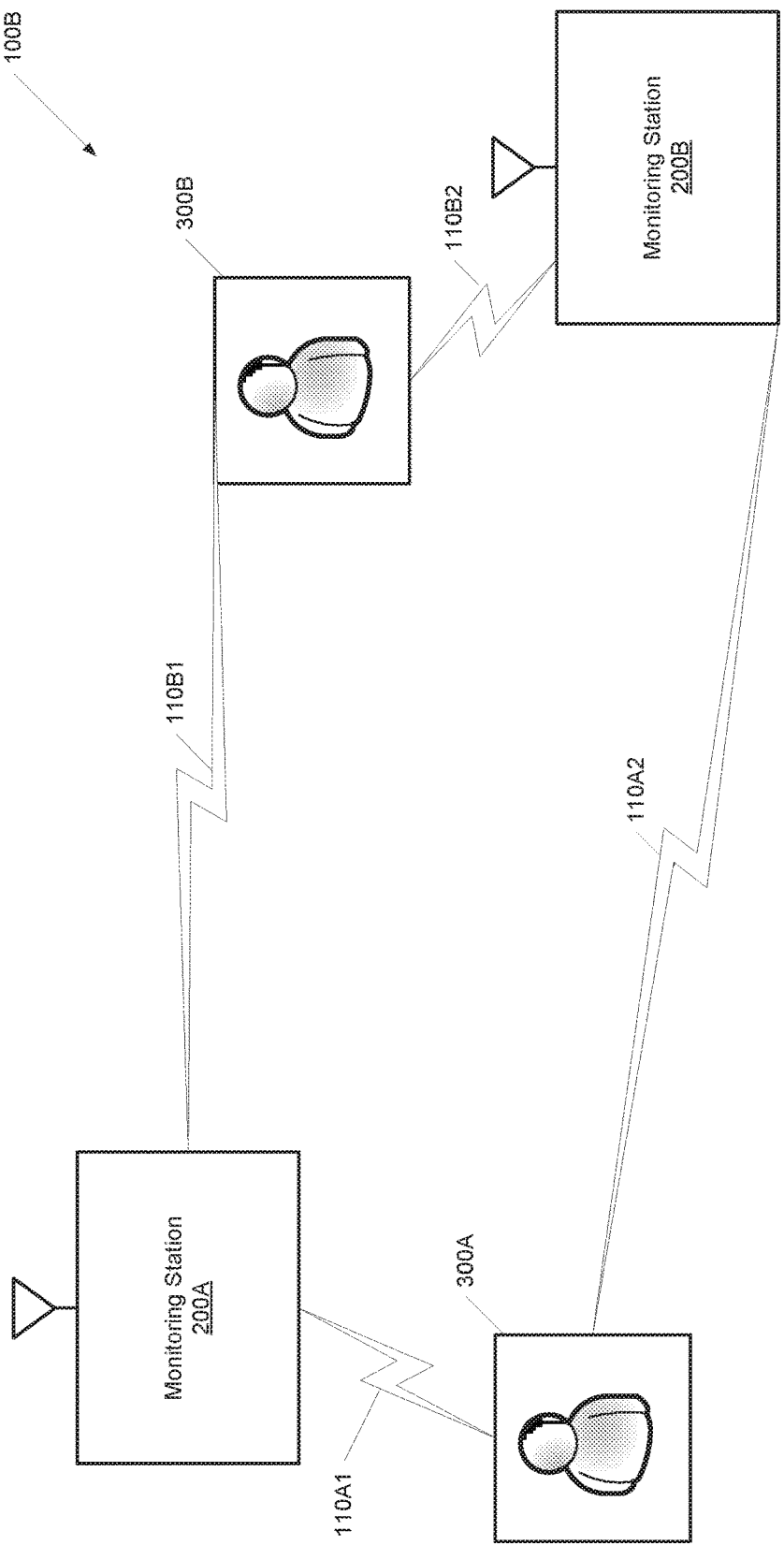
FIG. 19 is a schematic diagram of a monitoring system according to some embodiments.

As shown in FIGS. 18-19, in some embodiments two monitoring stations 200A, 200B may be in communication with one another, and the signal strength of the signals 110A1, 110B1 of the alarm devices 300A, 300B may be compared to determine an approximate location of the devices 300A, 300B. For example, one of the monitoring stations 200A may be near or in the pool area, and the other monitoring station 200B may be adjacent an exit. The signal strength of the alarm devices 300A, 300B are received at the monitoring stations 200A, 200B (Block 1000). As illustrated, one of the devices 300B is sufficiently far away from the monitoring station 200A in the pool area to indicate that the device 300B is either under water or leaving the pool area (Block 1002). The monitoring stations 200A, 200B compare the signal strength of the signals 110B1, 110B2 and determine that the signal 110B2 received by the station 200B is sufficiently high so as to indicate that the alarm device 300B is closer to the station 200B at the exit than it is to the monitoring station 200A in the pool area (Block 1004). One of the monitoring stations 200A, 200B activates a user alert to alert the swimmer that he or she is leaving the pool area (Block 1008). If the user deactivates the user alert, such as by pressing a button or returning the alarm device 300B to the monitoring station 200B (Block 1010), then the user alert is turned off (Block 1012). If the comparison of signals at Block 1004 indicates, however, that the signal strength of the signal 110B2 is not high at the monitoring station 200B near the exit area, then the central monitoring station 200A will issue an alarm to indicate a possible drowning event.

In this configuration, the system may determine whether an event is a possible drowning event or, if the swimmer (or possibly another adult) is able to deactivate the alarm, that the loss in signal is likely because the swimmer is inadvertently leaving the pool area. Therefore, the system may reduce false drowning alarms and reduce a probability that a swimmer would leave the pool area with an alarm device. In some embodiments, an additional monitoring station or stations may be placed in a different location from the pool monitoring station, such as at the outer limits of the recreational area. When a user takes an alarm device near the additional monitoring station as he or she is leaving the swimming area, the additional monitoring station may notify the primary or swim area monitoring station that the alarm unit is nearing the limits of the swim area, and the primary monitoring station is notified to not issue an alarm protocol if the signal is lost, e.g., when the simmer leaves the swim area. However, the additional monitoring station may itself alarm, notifying the swimmer and/or other swim staff such as desk staff at an entrance of a swimming facility that the alarm device is leaving the swimming area so that they may request that the alarm device be returned to the facility without triggering a poolside alarm and provoking unnecessary lifeguard anxiety.

In some embodiments, the sensor 315 (FIG. 3) is a water sensor, such as one or more electrode pairs that complete a circuit when wet. However, any suitable water sensor may be used. The device 300 may be configured to have a low power mode in which no data is being transmitted to the monitoring station 200 and a higher power mode in which data is transmitted to the monitoring station 200. When the device 300 is in the low power mode and the water sensor detects water (e.g., the electrode pair(s) are wet and thus complete a sensing circuit), then the device 300 switches from the low power mode to the high power mode. If the device 300 is unable to connect to the monitoring station 200, this could indicate that a swimmer has entered the water without permission (when the station 200 is not active) or a swimmer is under the water such that no signal may be transmitted, and therefore, the device 300 may sound a local alarm, including sound, vibrations, lights or other visual indicators. If the device 300 connects to the monitoring station 200, then the device 300 may either trigger an alarm protocol or the device 300 may be monitored as described herein. Accordingly, if a user forgets to turn on the device 300 before entering the water, the device 200 may be activated and monitored as described herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A monitoring system for monitoring a risk of drowning for users of one or more alarm devices, the system comprising:
   one or more alarm devices having one or more detectors configured to detect status data of the user, wherein the alarm device transmits a signal from at or below a water surface;
   a monitoring station having a controller circuit configured to receive status data from the alarm device, to detect a triggering event, and, in response to the triggering event, to select one of a plurality of alarm protocols based on the status data; wherein the monitoring station is configured to provide a user alert to the alarm device if a loss in signal strength of the alarm device is detected by the monitoring station, and the alarm device is configured to receive a deactivation input such that if a deactivation input is received within a predetermined time, the alarm protocol is canceled and/or an alarm protocol is not issued to the monitoring station, wherein the monitoring station comprises first and second monitoring stations each having a controller circuit configured to receive status data from the alarm device, the first monitoring station is a pool monitoring station and the second monitoring station is an exit monitoring station, and wherein a higher level of alarm is selected if the alarm device is closer to the pool monitoring station.

2. The monitoring system of claim 1, wherein at least one of the first and second monitoring stations are configured to detect a first signal strength of an alarm device received at the first monitoring station and a second signal strength received from the alarm device received at the second monitoring station, and to provide the user alert if the second signal strength at the second monitoring station is above a threshold level.

3. The monitoring system of claim 2, wherein the first monitoring station is configured to issue the alarm protocol indicating a potential drowning event if the second signal strength at the second monitoring station is below the threshold level and the first signal strength at the first monitoring station is below another threshold level.

4. The monitoring system of claim 1, the control circuit is configured to select an alarm if the device is disconnected from the user, and the control circuit is further configured to select a higher level of alarm if the device is disconnected while wet and a lower level of alarm or no alarm at all if the device is disconnected while dry.

5. The monitoring system of claim 1, wherein the alarm device comprises a water sensor, and the alarm device has an active mode in which a signal is transmitted to the monitoring station and an inactive mode that uses a lower level of power than the active mode, wherein the alarm device is configured to switch from the inactive mode to the active mode if the alarm device water sensor detects water.

6. The monitoring system of claim 5, wherein the alarm device switches from the inactive mode to the active mode when the alarm device water sensor detects water, and when the alarm device in the active mode is not connected to the monitoring station, the alarm device is configured to trigger an alarm protocol at the alarm device.

7. The monitoring system of claim 1, wherein the alarm device transmits an RF signal at a power and frequency that is adjustable by a user to control a propagation depth such that the RF signal has a power and frequency capable of propagating through the propagation depth.

8. The monitoring system of claim 7, wherein the propagation depth is between two and sixteen inches of water.

9. The monitoring system of claim 1, wherein the status data comprises an RF signal having a signal strength profile, and the triggering event comprises an oscillating signal strength profile of the RF signal.

10. The monitoring system of claim 9, wherein the oscillating signal strength profile of the RF signal has a magnitude that decreases over time.

11. The monitoring system of claim 1, further comprising:
a transceiver configured to receive a signal from the alarm device, wherein the signal comprises the status data, and the triggering event comprises a reduction and/or cessation of the signal from the alarm device.

12. A monitoring system for monitoring a risk of drowning for users of one or more alarm devices, the system comprising:
one or more alarm devices configured to transmit a signal from at or below a water surface;
a first monitoring station and a second monitoring station in communication with the first monitoring station, the first and second monitoring stations each having a control circuit configured to receive the signal from at least one of the alarm devices and to determine whether the alarm device is closer to the first monitoring station or the second monitoring station based on a signal strength of the signal from the alarm device; and
wherein the first and second monitoring stations are configured to detect a triggering event comprising a reduction of signal strength from one of the alarm devices and to selection one of a plurality of alarm protocols based on the reduction of signal strength and the determination of whether the alarm device is closer to the first monitoring station or the second monitoring station, wherein the first monitoring station is a pool monitoring station and the second monitoring station is an exit monitoring station, and wherein a higher level of alarm is selected if the alarm device is closer to the pool monitoring station.

13. The monitoring system of claim 12, wherein if the alarm device is closer to the exit monitoring station when the triggering event is detected, an alarm protocol at the alarm device is initiated to alert the user to return the alarm device.

14. The monitoring system of claim 13, the control circuit of at least one of the first and second monitoring station is configured to select an alarm if the device is disconnected from the user, and the control circuit is further configured to select a higher level of alarm if the device is disconnected while wet and a lower level of alarm or no alarm at all if the device is disconnected while dry.

15. The monitoring system of claim 13, wherein the alarm device comprises a water sensor, and the alarm device has an active mode in which a signal is transmitted to the monitoring station and an inactive mode that uses a lower level of power than the active mode, wherein the alarm device is configured to switch from the inactive mode to the active mode if the alarm device water sensor detects water.

16. The monitoring system of claim 15, wherein the alarm device switches from the inactive mode to the active mode when the alarm device water sensor detects water, and when the alarm device in the active mode is not connected to the monitoring station, the alarm device is configured to trigger an alarm protocol at the alarm device.

17. A monitoring system for monitoring a risk of drowning for users of one or more alarm devices, the system comprising:
one or more alarm devices having one or more detectors configured to detect status data of the user, wherein the alarm device transmits a signal from at or below a water surface, and the one or more detectors comprises a water sensor; and
a monitoring station having a controller circuit configured to receive status data from the alarm device, to detect a triggering event, and, in response to the triggering event, to select one of a plurality of alarm protocols based on the status data;
wherein the alarm device has an active mode in which a signal is transmitted to the monitoring station and an inactive mode that uses a lower level of power than the active mode, and the alarm device is configured to switch from the inactive mode to the active mode if the alarm device water sensor detects water, wherein the monitoring station comprises first and second monitoring stations each having a controller circuit configured to receive status data from the alarm device, the first monitoring station is a pool monitoring station and the second monitoring station is an exit monitoring station, and wherein a higher level of alarm is selected if the alarm device is closer to the pool monitoring station.

18. The monitoring system of claim 17, wherein when the alarm device switches from the inactive mode to the active mode when the alarm device water sensor detects water and the alarm device is not connected to the first and second monitoring stations, the alarm device is configured to trigger an alarm protocol at the alarm device.

19. A method for monitoring a risk of drowning for users of one or more alarm devices, the one or more alarm devices having one or more detectors configured to detect status data of the user, wherein the alarm device transmits a signal from at or below a water surface, and a monitoring station configured to receive status data from the alarm device; the method comprising:
receiving status data at the monitoring station from at least one of the alarm devices;
detecting a triggering event; and
in response to the triggering event, selecting one of a plurality of alarm protocols based on the status data;
providing a user alert to the alarm device if a loss in signal strength of the alarm device is detected by the monitoring station; and
receiving a deactivation input such that if a deactivation input is received within a predetermined time, the alarm protocol is canceled and/or an alarm protocol is not issued to the monitoring station, wherein the monitoring station comprises first and second monitoring stations each having a controller circuit configured to receive status data from the alarm device, the first monitoring station is a pool monitoring station and the second monitoring station is an exit monitoring station, and wherein a higher level of alarm is selected if the alarm device is closer to the pool monitoring station.

20. A method for monitoring a risk of drowning for users of one or more alarm devices that are in communication with first and second monitoring devices, the one or more alarm devices having one or more detectors configured to detect status data of the user, wherein the alarm device transmits a signal from at or below a water surface, the method comprising:
- receiving a signal from at least one of the alarm devices;
- determining whether the alarm device is closer to the first monitoring station or the second monitoring station based on a signal strength of the signal from the alarm device; and
- detecting a triggering event comprising a reduction of signal strength from one of the alarm devices; and
- selecting one of a plurality of alarm protocols based on the reduction of signal strength and the determination of whether the alarm device is closer to the first monitoring station or the second monitoring station, wherein the first monitoring station is a pool monitoring station and the second monitoring station is an exit monitoring station, and wherein a higher level of alarm is selected if the alarm device is closer to the pool monitoring station.

* * * * *